United States Patent
Brandenburg et al.

(10) Patent No.: US 6,645,317 B1
(45) Date of Patent: Nov. 11, 2003

(54) METAL COMPONENTS FOR PICTURE TUBES

(75) Inventors: Volker Brandenburg, Mülheim (DE); Carl-Heinz Schütz, Duisburg (DE); Klaus-Peter Helmetag, Hagen (DE)

(73) Assignees: Thyssen Krupp Stahl AG, Dusseldorf (DE); Wickeder Westfalenstahl Holding GmbH, Wickede (DE)

( * ) Notice: Subject to any disclaimer, the term of this patent is extended or adjusted under 35 U.S.C. 154(b) by 0 days.

(21) Appl. No.: 09/980,868

(22) PCT Filed: Apr. 28, 2000

(86) PCT No.: PCT/EP00/03858

§ 371 (c)(1), (2), (4) Date: Jun. 6, 2002

(87) PCT Pub. No.: WO00/68444

PCT Pub. Date: Nov. 16, 2000

(30) Foreign Application Priority Data

May 8, 1999 (DE) .......................................... 199 21 328

(51) Int. Cl.$^7$ ..................... C21D 38/04; C21D 38/06; C21D 38/02
(52) U.S. Cl. .................. 148/320; 420/123; 420/128
(58) Field of Search .................. 148/320; 420/123, 420/128

(56) References Cited

FOREIGN PATENT DOCUMENTS

| JP | 7197185 A | 8/1995 |
|---|---|---|
| JP | 7233440 A | 9/1995 |
| JP | 9296255 A | 11/1995 |
| JP | 3223441 A | 10/1997 |
| JP | 11050207 A | 2/1999 |

*Primary Examiner*—Deborah Yee
(74) *Attorney, Agent, or Firm*—Proskauer Rose LLP

(57) ABSTRACT

A steel material suitable for producing components for picture tubes, in particular for producing masks, shielding covers or frames for such picture tubes, with outstanding characteristics concerning the requirements to be met by such components, according to the invention, comprises the following composition (in weight %):

| | |
|---|---|
| C: | 0.0001–0.01%, |
| N: | 0.0001–0.0035%, |
| Mn: | 0.01–0.7%, |
| Si: | <0.03%, |
| P: | <0.1%, |
| S: | <0.1%, |
| Al$_{acid\text{-}soluble}$ | <0.008%, |
| Cr: | <0.1%, |
| Mo: | 0.0001–0.08%, |
| Sn: | <0.015%, | if necessary further additives with the remainder being iron and the usual impurities.

8 Claims, No Drawings

METAL COMPONENTS FOR PICTURE TUBES

BACKGROUND OF THE INVENTION

The invention relates to a steel for producing components for picture tubes, in particular for producing masks, shielding covers or frames for such picture tubes. Furthermore, the invention relates to a method for producing steel sheet intended for producing components for picture tubes, using such a steel.

Picture tubes of television sets, computer monitors and the like comprise so-called shadow masks, aperture masks or grille masks. These masks consist of a steel sheet, 0.05 to 0.2 mm in thickness, comprising a multitude of regularly arranged apertures or slots. Their function consists of delimiting the cathode ray of the picture tube before it reaches the coatings of the display screen, which coatings emit red, blue or green light. In this way an image of excellent sharpness and contrast can be generated on the display which is visible to the viewer. Furthermore, the masks shield the picture tube from external magnetic influences while at the same time preventing excessive electron radiation from reaching the surroundings.

To ensure effective shielding, as a rule the masks comprise a soft magnetic material based on a non-alloyed low-carbon steel enriched with Cr and killed with aluminium. Usually, such a steel is melted in a converter and poured to form slabs or thin slabs. These slabs are first hot rolled, then pickled, cold rolled for a first time before being subjected to a first annealing in decarburising medium, so as to achieve an extremely low carbon content. The strip annealed in this way is again cold rolled before the apertures or slots for the shadow masks are produced in a photoetching process.

Sheets are cut to size from the perforated starting material. In the case of slotted masks, these sheets are placed in a frame which keeps the thin stay-like slot delimitations taut by means of mechanical tension. In the case of perforated masks, if necessary, the sheets which have been cut to size, are subjected to recrystallising annealing before being deformed by deep drawing and stretch drawing. Both in the case of slot masks and in the case of aperture masks, final annealing is carried out during which the desired darkening of the mask is achieved.

This normal procedure is associated with disadvantages in that annealing in decarburising medium has to be carried out slowly, with an open coiler, in a bell-type annealing furnace. Furthermore, the rolling geometry during the second cold rolling step has to be maintained with the highest precision which means that the rolling mill used must meet the highest requirements concerning controllability and accuracy of dimension.

The production process and operational requirements of masks in picture tubes dictate that the starting material must have a good degree of purity and defined grain sizes so as to ensure a clean etched image. Furthermore, the material must have a yield point without permanent elongation so as to be able to be deformed without any danger of deformation lines occurring.

The material for tensioned masks must have good form stability also at the considerable tension forces acting upon it in the installed state, with such form stability having to be ensured even under the influence of heat during further production steps. Otherwise there is a danger that relaxation of the mask material will result in deformation of the apertures or slots made in the material. Such loss of tension as a result of excessive yielding of the material, as a result of which the respective component loses its shape, leads to colour shifts during the projection of the image on the display screen because the colour dots are no longer properly rendered. The aforesaid applies in particular in the case of masks comprising regularly arranged apertures of small diameter.

The Japanese published application JP 62249339 A discloses an extra-low carbon steel which is intended to meet the requirements stated. Apart from iron and unavoidable impurities, this steel comprises 0.0040–0.01% nitrogen, less than 0.03% C, less than 0.03% Si, and less than 0.1% $Al_{acid\text{-}soluble}$ (all details in weight %). A nitrogen content of at least 40 ppm prevents residual elongation during recrystallisation annealing. It has been found that the greater the nitrogen content, the smaller the relaxation. The Japanese published application therefore recommends a nitrogen content of 0.0055–0.0075 weight %. However, taking into account the usually applied process steps in the production of steel, such levels of nitrogen content are undesirable.

SUMMARY OF THE INVENTION

It is thus the object of the invention to provide a steel material suitable for producing components for picture tubes, said steel material comprising outstanding characteristics concerning the requirements to be met by such components. Furthermore, it is the object of the invention to provide a method for producing steel sheet intended for producing components for picture tubes, using such a steel.

From the point of view of the material, this object is met by a steel with the following composition (in weight %):

| | |
|---|---|
| C: | 0.0001–0.01%, |
| N: | 0.0001–0.0035%, |
| Mn: | 0.01–0.7%, |
| Si: | <0.03%, |
| P: | <0.1%, |
| S: | <0.1%, |
| $Al_{acid\text{-}soluble}$ | <0.008%, |
| Cr: | <0.1%, |
| Mo: | 0.0001–0.08%, |
| Sn: | <0.015%, | if necessary further additives with the remainder being iron and the usual impurities.

In spite of its low nitrogen content, a steel with such a composition comprises characteristics which make it eminently suitable for producing components for picture tubes. Surprisingly, it has been found that the slight tendency to relaxation in the deformed annealed condition—which in the state of the art occurs only with an increased content of N—can be achieved at a lower nitrogen content if at the same time a reduced carbon content is taken into account. The addition of molybdenum and tin further improve the creep characteristics in the iron solid-solution. As a result, the invention provides a steel which makes possible the production of components for picture tubes, in particular aperture masks or grille masks with effective reduction or prevention of relaxation of the material during the production process.

According to the invention, the carbon content is limited to max. 0.01 weight %, because carbide fractions are increased if the carbon content exceeds this value. Such an increase would result in reduced etchability of the steel. In addition, exceeding the maximum carbon content according to the invention would increase the quantity of dissolved carbon in the steel, with a resulting increase in the flow resistance and extension of the flow limit after final annealing. These would have a negative effect on the deformability of the sheet. The carbon content of a steel according to the invention should therefore be as low as possible. According to a preferred embodiment of the invention, the carbon content is therefore limited to less than 0.008 weight %.

The nitrogen content, due to its strong interstitial effect in combination with the equally interstitial effect of carbon, affects the creep resistance. Therefore, according to the invention, the nitrogen content is limited to values below 0.0035 weight %. In this context, a nitrogen content below 0.003 weight % is preferred because at such a low content, a further improved creep resistance is obtained. In addition, as a result of limiting the nitrogen content according to the invention, with respect to the presence of aluminium, an increase in the fraction of unfavourable AlN is prevented. As a result of AlN precipitation, the etchability of a sheet made from the respective steel is also limited, with its deformability being reduced.

Due to the reduction of the AlN fraction which is associated with lowering the aluminium content, and the resulting improvement of etchability, the steel with the composition according to the invention is particularly well suited to producing components of picture tubes. At the same time, as a result of the very substantial prevention of AlN, all the nitrogen is kept in solution (interstitial). Together with the carbon, which at a low carbon content is also present in solution, from the point of view of reducing elongation as a result of blocking of dislocations, nitrogen is more effective when compared to a situation where these elements would be present in a precipitated form (in the form of AlN). From the point of view of the required profile of characteristics (low elongation values), the combination of low aluminium content in combination with low nitrogen and carbon content is thus particularly favourable.

Manganese prevents hot brittleness which would otherwise be caused by the formation of FeS, in that sulphur in the form of MnS is precipitated. Therefore, according to the invention, at least 0.01 weight % of manganese is added to the steel. However, at a manganese content exceeding 0.7 weight %, the steel becomes too hard and its formability deteriorates due to the hardening of manganese present in solid solution. In the steel according to the invention, an optimal compromise between the negative and positive characteristics of manganese can be achieved if the manganese content is $\geq 0.4$ weight % and $\leq 0.6$ weight %, preferably 0.5 weight %.

Phosphorus is a substitutional alloy element with a considerable hardening effect in solid solution. However, excessive hardening of the steel has a negative effect on its deformability. For this reason, according to the invention, the P content is limited to values below 0.1 weight %.

Sulphur forms sulphide-like non-metallic inclusions which have a negative effect on the etchability of sheet made from such steel. For this reason, the S content according to the invention is less than 0.1 weight %.

During steel production, aluminium is added for deoxidisation. As mentioned, in conjunction with nitrogen, this can result in the formation of AlN. Apart from reducing the etchability, these aluminium nitrides also cause increased hardness of the steel. For this reason, according to the invention, the content of $Al_{acid\text{-}soluble}$ is limited to less than 0.008 weight %. The Al content should be as low as possible; in a preferred embodiment of the invention it is<0.003 weight %.

Chromium is added to a maximum content of 0.1 weight % because this element increases the adhesive property of the oxide film which is generated by darkening annealing as part of the production of masks. If more than 0.1 weight % of chromium is added to a steel of the type according to the invention, its hardness increases too much to still maintain the required deformability.

As an element with a large difference in atomic radius compared to iron, molybdenum enhances creep resistance and thus resistance to relaxation of the steel material during the production of components, in particular aperture masks or grille masks, for picture tubes. However, with a content exceeding 0.08 weight %, Mo excessively impedes recrystallisation during intermediate annealing which may be carried out. The influence of molybdenum on a steel according to the invention is optimal if the Mo content is<0.006 weight %.

Tin has the same positive effect on creep resistance as does molybdenum. At the same time however, tin causes the steel to become brittle. For this reason, according to the invention, the tin content is limited to values of<0.015 weight %.

According to a further advantageous embodiment of the invention, up to 0.3 weight % of tungsten is added to the steel. This addition of tungsten further improves creep resistance.

Due to its good form stability under considerable load, its good etchability and its magnetic properties, the steel according to the invention is eminently suitable for producing shadow masks, aperture masks or grille masks, frames or shielding covers for picture tubes.

DETAILED DESCRIPTION OF THE INVENTION

From the point of view of the method for producing steel sheet intended for producing masks for picture tubes, using a steel according to the invention, the object of the invention is met in that at least the following steps are carried out:

melting the steel;

continuous casting of the molten steel to form slabs or thin slabs;

annealing of the cast slabs or thin slabs at a temperature of 1050–1250° C.;

hot rolling the annealed slabs or thin slabs at temperatures of 800–940° C. to a hot strip with a thickness of 0.7–4.5 mm;

coiling the hot strip at a temperature of 300–650° C.; and cold rolling the strip to a final thickness at a reduction ratio of 40–90% for each cold-rolling step.

If the process steps according to the invention are observed and if a steel according to the invention is used as a basis, cold-rolled steel sheet is obtained which has outstanding etchability and creep resistance. Subsequent to the process steps according to the invention, the process steps which are usually carried out during production of the relevant component for picture tubes, are carried out.

If required, cold rolling can be carried out in several stages. Depending on the product to be produced, it may also be advantageous, between the cold-rolling steps, to carry out intermediate annealing at a temperature of 300–800° C. Intermediate annealing can be carried out as bell annealing (batch annealing) or in a continuous furnace. To improve the accuracy of dimension and the surface appearance, it is also favourable if the cold-rolled steel strip is rerolled following cold rolling.

Below, the invention is explained in more detail by means of an embodiment.

Table 1 shows the composition (in mass %) of steels used for the production of three steel sheets E1, E2 and E3, according to the invention, and of two comparison sheets V1, V2. In addition, Table 1 shows the thickness in mm of the respective sheets.

Each of the aluminium-killed steels was melted in an oxygen steel plant using a vacuum treatment, and continuously poured to slabs on a continuous casting machine. For homogenisation, the slabs were subsequently annealed at a temperature of approx. 1250° C.

In the case of the sheets E1, E2, E3, made on the basis of a steel according to the invention, the annealed slabs were hot-rolled to a hot strip 3 mm in thickness, at a finishing temperature of 890° C. The hot strip was coiled at a coiling temperature of approx. 570° C. Subsequently the hot strip was pickled and in a first stage was cold rolled to an intermediate thickness of 0.8 mm. This was followed by an intermediate annealing carried out at approx. 580° C., in a bell annealing furnace according to a bell annealing cycle.

Intermediate annealing was followed by a second stage of cold rolling in which the strip was cold-rolled to an intermediate thickness of 0.2 mm. Subsequently, short-time annealing at 750° C. was carried out. Then the strip was rerolled to its final thickness of 0.081 mm in variant E1; to 0.067 mm in variant E2, and to 0.076 mm in variant E3.

In the case of the comparison sheet V1 which does not form part of the invention, the annealed slab was rolled to a hot strip of 2.5 mm thickness at a finishing temperature of approx. 870° C. and coiled at a temperature of approx. 580° C. After pickling and cold rolling to an intermediate thickness of 0.8 mm, hood annealing at approx. 650° C. was carried out according to a hood cycle. Subsequently, in a further step, the strip was cold-rolled to a final thickness of 0.1 mm.

In the case of the comparison sheet V2 which also does not form part of the invention, the slab was rolled to a hot strip, 3 mm in thickness, at a finishing temperature of 860° C. The hot strip was then coiled at a temperature of 590° C. This was followed by pickling and cold rolling to an intermediate thickness of 0.9 mm, followed by bell annealing at approx. 650° C. subsequently, in a second step, the cold strip which had previously been subjected to intermediate annealing, was cold-rolled to its final thickness of 0.1 mm.

An approximate estimate of the creep resistance can be obtained on the basis of the elongation at fracture $A_{80}$ obtained in the tensile test. For this reason Table 2 shows the mechanical properties "Tensile strength $R_m$" and "Elongation at fracture in transverse direction $A_{80}$" of a sheet which after completion of cold strip production was not subjected to an annealing step (i.e. in the case of sheets E1, E2, E3 after rerolling, and in the case of the comparison sheets V1, V2 after the second stage of cold rolling). Table 2 also shows the mechanical properties "Tensile strength $R_{m/470° \, C. \, annealed}$" and "Elongation at fracture, in transverse direction $A_{80/470° \, C. \, annealed}$" which are obtained if, after cold rolling, the sheets E1, E2, E3, V1, V2 are subjected to further annealing treatment at approx. 470° C., as is for example the case during the production of aperture masks or grille masks for picture tubes.

Outstanding creep resistance which makes a sheet suitable for use in producing components for picture tubes is present if the elongation at fracture is $A_{80/470° \, C. \, annealed} < 1\%$. Furthermore the tensile strength $R_{m/470° \, C. \, annealed}$ should be above 600 N/mm².

The sheets E1, E2, E3 achieved elongations at fracture $A_{80/470° \, C. \, annealed}$ of significantly less than 1%, while at the same time achieving tensile strengths $R_{m/470° \, C. \, annealed}$ significantly above 600 N/mm². This shows the outstanding creep resistance and suitability of steel sheets produced according to the invention.

In contrast, the comparison sheets V1, V2 which do not form part of the invention, achieved elongations at fracture $A_{80/470° \, C. \, annealed}$ of 10.5% and 5.5% respectively, and comparison sheet V1 achieved a tensile strength $R_{m/470° \, C. \, annealed}$ of less than 600 N/mm². Consequently, both from the point of view of their creep resistance and their strength, these sheets fail to meet the essential requirements specified for use in producing components for picture tubes, while the sheets according to the invention meet these requirements.

TABLE 1

| | | (Percentiles of the composition in weight %) | | | | | | | | | | | |
|---|---|---|---|---|---|---|---|---|---|---|---|---|---|
| Sheet | Thickness [mm] | C | Si | Mn | P | S | Al$_{SL}$ | N | Cu | Cr | Sn | Ni | Mo |
| E1 | 0.081 | 0.0076 | <0.002 | 0.46 | 0.009 | 0.005 | 0.001 | 0.0035 | 0.007 | 0.033 | 0.01 | 0.022 | 0.003 |
| E2 | 0.067 | 0.0076 | <0.002 | 0.46 | 0.009 | 0.005 | 0.001 | 0.0035 | 0.007 | 0.033 | 0.01 | 0.022 | 0.003 |
| E3 | 0.076 | 0.0076 | <0.002 | 0.46 | 0.009 | 0.005 | 0.001 | 0.0035 | 0.007 | 0.033 | 0.01 | 0.022 | 0.003 |

TABLE 1-continued (Percentiles of the composition in weight %)

| Sheet | Thickness [mm] | C | Si | Mn | P | S | $Al_{SL}$ | N | Cu | Cr | Sn | Ni | Mo |
|---|---|---|---|---|---|---|---|---|---|---|---|---|---|
| V1 | 0.1 | 0.012 | <0.002 | 0.37 | 0.007 | 0.009 | 0.003 | 0.0054 | 0.014 | 0.022 | 0.001 | 0.019 | 0.001 |
| V2 | 0.1 | 0.0003 | 0.018 | 0.29 | 0.007 | 0.006 | 0.048 | 0.005 | 0.011 | 0.013 | 0.002 | 0.018 | 0.002 |

TABLE 2

| Sheet | $R_m$ [N/mm²] | $A_{80}$ [%] | $R_{m/470°\ C.\ annealed}$ [N/mm²] | $A_{80/470°\ C.\ annealed}$ [%] |
|---|---|---|---|---|
| E1 | 782 | 0,3 | 616 | 0,5 |
| E2 | 724 | 0,5 | 667 | 0,0 |
| E3 | 782 | 0,3 | 654 | 0,5 |
| V1 | 750 | 5,5 | 583 | 10,5 |
| V2 | 725 | 2,2 | 623 | 4,2 |

What is claimed is:

1. Metal components for picture tubes, made from a steel comprising, in weight %:

| | |
|---|---|
| C: | 0.0001–0.01%, |
| N: | 0.0001–0.0035%, |
| Mn: | 0.01–0.7%, |
| Si: | <0.03%, |
| P: | <0.1%, |
| S: | <0.1%, |
| $Al_{acid-soluble}$: | <0.003%, |
| Cr: | <0.1%, |
| Mo: | 0.0001–0.08%, |
| Sn: | <0.015%, |
| W: | <0.3%, | the balance being iron and the inevitable impurities.

2. The metal components of claim 1, wherein the steel comprises <0.008 weight % C.

3. The metal components of claim 1, wherein the steel comprises ≦0.003 weight % N, 4. The metal components of claim 1, wherein the steel comprises ≧0.4 weight % Mn.

5. The metal components of claim 1, wherein the steel comprises 0.006% Mo.

6. The metal components of claim 1, wherein the steel comprises ≦0.5 weight % Mn.

7. The metal components of claim 1, wherein the steel comprises ≦0.6 weight % Mn.

8. The metal components of claim 1, wherein the components are masks, shielding covers or frames for picture tubes.

* * * * *